Jan. 5, 1960 H. W. KOREN 2,920,149

MAGNETIC RECORD TRANSDUCING HEADS

Filed Nov. 21, 1957 2 Sheets-Sheet 1

INVENTOR.
H. W. Koren

BY Greene, Pineles & Durr.

ATTORNEYS

Jan. 5, 1960 H. W. KOREN 2,920,149

MAGNETIC RECORD TRANSDUCING HEADS

Filed Nov. 21, 1957 2 Sheets-Sheet 2

INVENTOR.
H. W. Koren

BY Greene, Pineles & Durr.

ATTORNEYS

United States Patent Office 2,920,149

Patented Jan. 5, 1960

2,920,149

MAGNETIC RECORD TRANSDUCING HEADS

Heiman W. Koren, Bronxville, N.Y., assignor to Sonotone Corporation, Elmsford, N.Y., a corporation of New York Application November 21, 1957, Serial No. 697,913

3 Claims. (Cl. 179—100.2)

This invention relates to magnetic record transducing heads of the type used for recording magnetic signals or reproducing magnetically recorded signals by magnetic flux interlinkage between the transducing windings of the magnetic head and a relatively wide record track of a magnetic recording medium such as a tape or sheet through relative movement between the head and the recording medium. However, the principles of the invention are also applicable to magnetic erasing heads for erasing magnetic signals previously recorded on a magnetic record track.

The heretofore widely used high-quality magnetic tape recording heads have two core sections of a magnetic core held fixed by a resin junction body in a magnetic shield casing of a rigid aligning structure which holds the core aligned in its operative position wherein a portion of the moving magnetic tape makes contact with the transducing gap region of the core which is embedded within the resin body that has an extended smooth guide surface along which the tape is smoothly guided past the transducing gap region of the core exposed along such guide surface. Such known heads have a number of limitations and deficiencies. Their core sections are upset when the head is exposed to relatively high operating temperatures; they undergo substantial wear during prolonged, continuous operation because of the abrading action of the ferrous oxide particles of the record track of generally used tapes; they also have a volume larger than desirable, particularly in the case of compact magnetic transducers requiring heads of minimized size.

Among the objects of the invention is a high-quality magnetic tape recording head which overcomes the deficiencies and limitations of known heads. Among the objects of the invention is also a tape recording head of the foregoing type, the over-all size or volume of which is only a fraction of the volume of heretofore available heads having similar performance characteristics.

Among the objects of the invention is a head of the foregoing type having simple, fixed electric terminals exposed at the aligning and mounting member of the head and eliminating the cumbersome flexible terminal cables of heretofore available tape-recording heads of this type.

The foregoing and other objects of the invention will be best understood from the following description of exemplifications thereof, reference being had to the accompanying drawings, wherein.

Figures 1, 2:
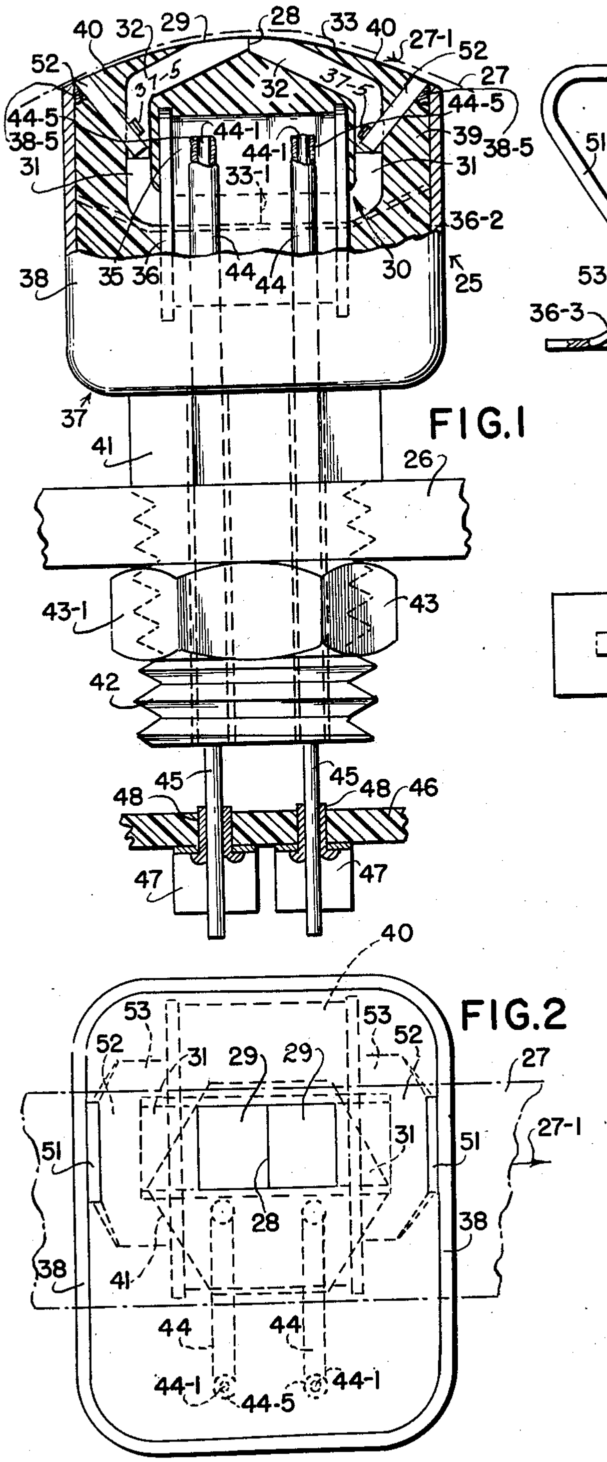
Fig. 1 is a greatly enlarged elevational side view of a representative head of the invention, with parts broken away, as it is mounted in its operative aligned position on a bracket of a magnetic recording and reproducing device.
Fig. 2 is a top edevational view of the head of Fig. 1 with a magnetic tape moving over its guide surface in contact with the transducing gap region of its magnetic core.
Figure 3:
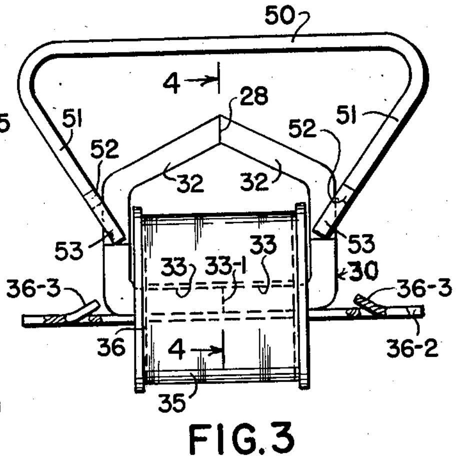
Fig. 3 is an elevational view similar to Fig. 1, of the two poles or the two core sections of the same head held assembled into a self-supporting unit by an aligning junction structure, before positioning it in its aligned position in the aligning casing structure of the head.
Figure 3A:
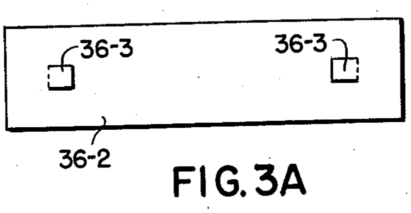
Figure 4:
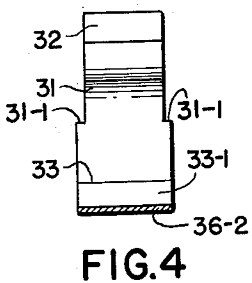
Figures 5, 7:
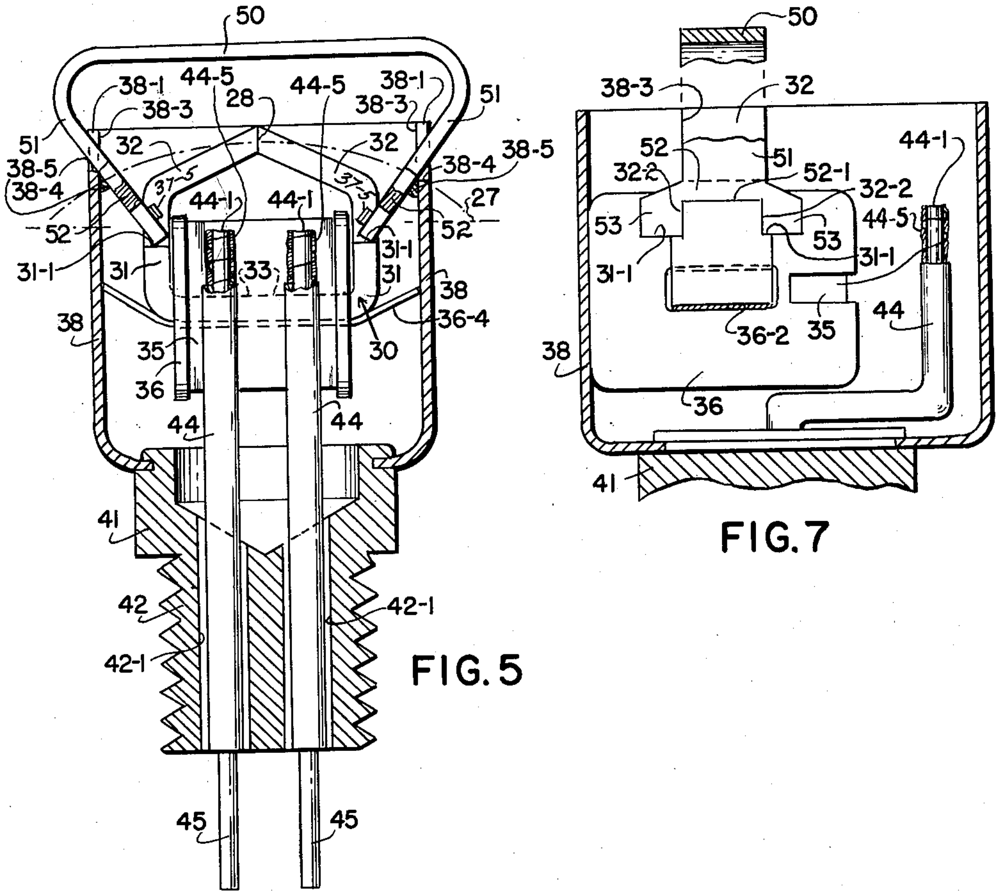
Figure 6:
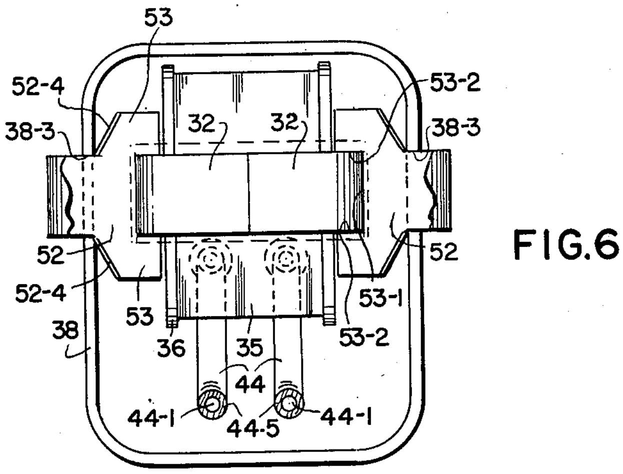

Fig. 3–A is a plan view of the metallic grounding strip that may be used for heads of the invention;

Fig. 4 is a side view of a core section of Figs. 1 and 3, along line 4—4 of Fig. 3;

Fig. 5 is a view similar to Fig. 1 of the same head before its aligning casing is filled with the resin junction body and before its transducing gap region and its guide surface are given the desired final shape or contour of Figs. 1 and 2;

Fig. 6 is a top view similar to Fig. 2 of the head assembly shown in Fig. 5; and Fig. 7 is a side view of the head assembly of Fig. 5, with the aligning casing in cross-section and broken away to expose interior details.

As used herein in the specification and claims, the expressions "transducing head" and/or "recording head," have the same meaning, and they are intended to mean not only a magnetic recording head suitable for recording magnetic signals or for reproducing them, but also a magnetic head which is used for erasing magnetically recorded signals.

The heretofore generally used high-quality magnetic tape recording heads have a pair of confronting core or pole sections held embedded in a solid resin junction body of a substantially rigid metallic aligning and casing structure with which the head is held mounted in aligned operative position so that the moving tape is smoothly guided over an exposed guide surface of the head past the transducing gap of the core. The metallic aligning structure usually has a magnetic shield casing filled with the cast resin body in which the magnetic core is embedded, the casing having an elongated metallic mounting member, usually in the form of a threaded cylindrical shank arranged to permit ready mounting of the head in its aligned operative positon relatively to the moving tape. In the known type of tape recording head, a loop-shaped, non-magnetic junction sheet member holds the core sections assembled to each other, and the core loop assembly is held by this sheet member within the casing while casting into it the resin which upon solidification holds the core in fixed aligned position relatively to the casing.

According to a phase of the invention, the core or pole sections of a head of the foregoing type are held assembled in their operative position in the aligning casing structure when casting into it and solidifying therein the resin binder, by a simple, elongated aligning member of spring sheet material having a set of two spaced aligning arm portions grippingly engaging and clamping to each other the two core sections of the head, and a set of two other aligning portions which are in aligning engagement with aligning elements of the casing or in general of the aligning structure by which the core sections are held in their aligned position relatively to the moving tape.

In such tape recording heads, the solidified resin body filling its casing is relied upon for fixing the aligned operative position of the transducing gap of its magnetic core sections relatively to its rigid metallic mounting member. Known epoxy resins which are hardened by curing at a temperature in excess of 180° C., such as 190° C.–200° C., are particularly desirable as junction bodies for such magnetic head, because the guide surface of such cured and cast resin has a relatively great hardness desired for guiding the tape along the transducing gap of the magnetic core held embedded in the cast resin. Such epoxy resins have a relatively high thermal coefficient of expansion, two or more times greater than that of the material of the magnetic core assembly. After curing, the cast epoxy resin body at such high temperature in excess of 180° C., the subsequent cooling to normal temperature, such as 20° C. to 30° C., causes the contracting cooled resin body to exert enormous contracting forces on the magnetic core assembly which contracts at a lower rate, resulting in uncontrollable variations and disturbance or upsetting of its critical transducing gap region, giving excessive production shrinkage.

The magnetic recording medium of most generally used magnetic record tapes, consists of a layer of fine particles of ferrosoferric oxide $Fe_3O_4$, and gamma ferric oxide $Fe_2O_3$, which are bonded by a resin binder content to the surface of a supporting tape. The magnetic ferrous oxide particles of such record tape have approximately the same hardness and abrasive action as the crocus particles or alpha ferric oxide which are used as abrasive powder for glass polishing, and is also used in what is known as crocus cloth for polishing metal.

According to the invention, the difficulties to which prior heads of the foregoing type have been subjected as a result of excessive wear by the abrasive action of the ferrous particles of the record tape and as a result of thermal differential expansion forces between the resin body and the core operatively fixed thereby, are minimized and rendered negligible by embodying in the resin junction body filling the head casing, with a dispersion of a critical amount of 50% to 65% of expansion-equalizing and wear-minimizing hard particles such as silica particles having a particle size such as —100 mesh to —250 mesh, or even finer, such as —350 mesh to —450 mesh particle size. In practice, very good results are obtained by dispersing in the liquid resin material before it is cast into the head casing, 55% to 65% by weight of such silica filler particles. Instead of silica particles, particles of other substances having a similar low coefficient of thermal expansion and similar hardness, may be used, such as aluminum oxide, beryllium oxide, zirconium oxide, zirconium silicate, aluminum silicate, ground quartz, sillimanite, or mixtures of such powder particles.

Thus, as explained above, by embodying the cast resin junction body dispersion of 50% to 65% by weight of small inorganic filler particles such as silica—or the other hard refractory inorganic particles having similar properties with respect to low coefficient of thermal expansion and resistance to abrasion—there are obtained the combined desirable effects of suppressing the upsetting of the critically minute transducing gap of the core assembly due to differential thermal expansion forces between the core and the cast resin body, and also of suppressing wear of the tape guide surface of the head along which the record tape is guided past the transducing gap region of the core, by the abrading action of the ferrous oxide particles of the magnetic record surface layer of the record tape, or of analogous magnetic recording media.

Prior magnetic tape recording heads of the type referred to above, have been provided with a flexible terminal-lead cable having insulated conductors with interior ends connected to the transducing windings of the head and embedded in the solidified resin junction body thereof, so that the outer ends of its insulated conductors could be utilized for connecting the transducer windings to the associated playback and recording circuits.

According to the invention, the elongated mounting member or shank of the head which also serves to align it relatively to the recording tape, is also utilized for holding affixed therein exposed strong and stiff electric terminal pins through which the windings of the head may be readily connected by conventional socket terminals to the associated external playback and recording circuits under the elimination of the cumbersome terminal cables heretofore used in such heads. The strong terminal pins are held fixed in the aligning shank of the head by the resin body filling its casing and passages of the aligning structure through which the terminal conductors pass to the exterior of the head.

Figs. 1 and 2 show a representative magnetic head 25 of the invention mounted in its operative aligned position on a rigid bracket 26 of a magnetic tape recording device having a magnetic recording tape 27 indicated by a dash-double-dot line, which moves past a transducing gap 28 of the head in a transducing direction indicated by arrow 27–1 applied to the tape 27. Although a magnetic head designed for recording on or playing back signals from a magnetic tape, or in general, on a relatively wide magnetic recording medium, will be herein described, the same head structure may also be used for erasing magnetically recorded signals, in which case its magnetic core structure has instead of a minute transducing gap 28, a relatively wide magnetic erasing gap through which its windings are magnetically interlinked with successive magnetic elements of the record track, which are to be erased as they pass the erasing gap of the head.

Referring to Figs. 1 and 2—and also to Figs. 2–7, showing the same head before a final contour shaping operation—the head 25 comprises two confronting core sections or pole pieces 31 which are shown as two identical halves of a closed magnetic circuit or core loop, generally designated 30. The two core sections or pole pieces 31 are held joined to each other with the end faces of their outer pole legs 32 facing each other along the minute transducing gap 28, and their inner core legs 33 in contact with each other along their facing similar leg end surfaces. The pole pieces 31 are formed of high-permeability, low-retentivity magnetic material of the type generally used for magnetic recording heads. The magnetic core loop 30 of the head is interlinked with transducing windings shown as coil 35 wound on a bobbin 36 surrounding the inner core legs 33. The magnetic core 30 with its minute transducing gap 28 and its winding 35, is held fixed in a predetermined aligned position in its aligning structure 37, which is held fixed in the mounting bracket 26 in its properly aligned position relatively to the moving record tape 27. The aligning structure 37 is shown in the form of a casing 38 having casing walls surrounding the core 30 on all sides except along its guide surface 40 on which are exposed the core pole faces 29 with the transducing gap 28 along which the record tape 27 moves. The magnetic core 30 with its windings 35 is held fixed within the aligning casing 38 by a junction body 39 of non-magnetic material such as solidified resin, which cements and joins all parts within the casing to each other and to the casing 38.

The aligning casing structure 37 of the head 25 is provided with an elongated aligning member 41 extending from its casing 38 and having a threaded shank 42 held seated in an aligning opening of the supporting bracket 26, being secured thereto by a nut 43 engaging the threaded shank 42. The part of the mounting member 41 which adjoins the casing 38 has exposed key surfaces corresponding to the exposed key surfaces 43–1 of the clamping nut 43 so as to make it possible to grip the key surfaces, as with wrench jaws, for turning the head around the shank axis until the transducing gap 28 is brought to the properly aligned position relatively to the moving tape 27, in which position the head 25 is locked by tightening the clamping nut 43.

The magnetic shield casing 38 is secured to the adjoining elongated aligning member 41 in any suitable way. Thus it may be secured in the manner shown, by an extension of the aligning member 41 which is peened over the edge of a circular opening of the casing 38, in the manner shown in Fig. 5, to form a rigid fixed junction between them.

Within the interior of the mounting member 41 and its shank 42 are held affixed and mounted, relatively stiff, electrically insulated terminal conductors 44, the inner ends 44–1 of which are stripped of insulation and have connected thereto, as by soldering, the terminal ends of the coil winding 35. From the exposed outer end of the relatively rigid mounting member, project relatively stiff, stripped metallic terminal pin portions 45 of the two terminal conductors 44, and they serve as stiff metallic terminal pins through which the head is connected to associated playback or recording circuits. The inwardly projecting parts of the terminal conductors are offset relatively to their portions which extend through the mounting shank coaxially with their exposed outer terminal pins 45. The two stiff external terminal pins 45 of the head are similar to the exposed projecting terminal pins of miniature amplifier tubes through which such tubes are connected to the associated amplifier or communication circuits. The playback and recording circuits are readily connected to the terminal pins 45 of the head by a conventional terminal connector socket, such as indicated at 46, which are similar to the conventional miniature connector sockets. Thus, as shown in Fig. 1, the connector socket 46 may consist of a stiff, strong, flat mounting member of insulating material, such as fibre-reinforced synthetic resin, having secured thereto two elastic contact springs 47 of conducting spring sheet metal such as beryllium copper, which have tail portions to which circuit leads are soldered. The two contact springs 47 are suitably secured to the insulating socket member 46 as by two hollow rivets 48 shaped to slip with a sliding fit over the two terminal pins 45 while springy U-shaped parts of the two contact springs 47 are elastically deformed by the terminal pins 45 passing thereover for making positive spring contact engagement therewith.

Figs. 5–7 show the head of Figs. 1 and 2, before the open casing side thereof has been ground down to give it the contour of the convex guide face 40 of Fig. 1. As shown in Figs. 5 and 6, and also in Figs. 3 and 4, the magnetic core loop 30 of the head is originally formed of a material having throughout the length of the core loop the same thickness, and its pole face legs 29 are ground down to the shape shown in Fig. 1 in a later production stage.

Unless otherwise specifically stated, when referring in the following description to the magnetic core loop 30 and to the aligning casing structure 38, it will be assumed that they have the shape shown in Figs. 2–7, and before they are given the contour shown in Fig. 1. The casing 38 of the aligning casing member 37 is made of high-permeability magnetic shield material, and serves as a magnetic shield for suppressing disturbance or interlinkage of disturbing external stray fields with the core 30 and its winding 35. The elongated mounting member 41 with its shank 42 are formed of suitable rigid material so as to secure proper supporting alignment of the head in its support bracket. Good results are obtained by making the mounting member 41 of brass, and the terminal conductors of beryllium copper.

The solid elongated shank 42 of the mounting member 41 is provided with elongated holes 42–1 of larger cross-sectional area than the circular, coated terminal conductors 44. After passing the coated insulated terminal conductors 45 through the oversized perforations 42–1 of the elongated mounting shank 42, the remaining free space of these shank perforations 42–1 is filled with an insulating resin cement which upon solidification joins and fixes the insulated terminal conductors within the shank 42. In practice, the junction body 39 of the head which holds the core 30 embedded and alignedly fixed therein relatively to the casing and its mounting member 41, is formed by a synthetic resin which is cast in liquid state into the interior of casing 38 while the two core sections 31 are held properly aligned therein until the solidified cast resin forms the fixed aligning junction between them. As the liquid synthetic resin is so cast into the hollow casing 38, the liquid resin flows also into the free space of the elongated junction holes 42–1 of the aligning shank 42 so that the core structure 30 and the terminal conductors 44 with their terminal pins 45 are held affixed in their operative position in the aligning structure 38 with its mounting structure 41 by the solidified cast resin body 39.

As seen in Figs. 1 and 2, the part of the resin junction body 39 filling the interior of the aligning and shield casing 38 which is exposed along the open side of the casing, has a continuous guide surface 40 of utmost smoothness, along which the tape 27 is smoothly guided into and away from smooth contact engagement with the pole faces 29 of the core gap region 28. The two core pole sections 31 are embedded and fixed in the synthetic resin junction body 39 so as to expose the core pole faces 29 as smooth continuities of the smooth guide surface 40 along which the tape is guided toward, past and away from the core gap region 28. After grinding away the exposed side of the head assembly shown in Figs. 2–6, to give it the contour of the continuous guide surface 40 of Figs. 1 and 2, this guide surface 40 is subjected to a polishing operation which imparts to this guide surface 40 a polished condition of utmost smoothness which guides the tape with extreme smoothness into intimate contact with the smooth core pole faces 29 of the core gap region 28 as it moves past it.

In accordance with the invention, the sectional core loop 30 has a resilient elongated aligning junction member 50 of spring sheet material, such as sheet metal, for holding the two core sections 31 assembled and properly aligned in the open aligning casing 38 until the cast resin is placed and solidified therein. The elongated junction member 50 has a set of two opposing aligning fingers 53 arranged to engage the exterior side surfaces of the two confronting core sections and hold them in their assembled position across their facing leg end surfaces, in the manner shown in Figs. 3–7. Each of the two core sections 31 of the core loop 30 has an aligning shoulder portion 31–1 arranged so that the two assembled core sections are engaged by the aligning fingers 53 of the spring junction members 50 at these predetermined aligning shoulder portions 31–1 of the two core sections. Furthermore, the resilient elongated aligning junction member 50 is also provided with a set of two opposite aligning portions shaped into aligning engagement with aligning and locating portions 38–1 along the open edge region of the aligning casing 38 of the head aligning structure 41, for fixing the position in which the resilient aligning junction member holds the assembled core section within the casing while the liquefied resin material filling the casing is cast and solidified therein.

In accordance with the invention, the elongated spring junction and aligning member 50 for the two core sections 31 is arranged so that the major intermediate part thereof is positioned outside and beyond the boundary of the aligning casing 38 of the head 25, for making it possible to reduce to a minimum the over-all volume or size of the head while enabling simplified, mass-production manufacture of miniature size, high-quality magnetic heads with the critical transducing gap 28 in accurate alignment relatively to its aligning structure 41.

In the form shown in Figs. 3–7, the elongated spring junction member 50 is formed of strong spring sheet metal having good elastic properties, such as beryllium copper. The elongated aligning member 50 is of generally C-shape and it has two inwardly turned arms 51 terminating in two aligning end grips 52 with grip edges 52–1 engaging the flat outer side surfaces of the two core sections 31 for holding them gripped in their assembled position. The aligning member 50 and its two end grips 52 are so arranged that the grips 52 engage the two core sections along the central regions of their outer side surfaces so as to exert balanced gripping forces along a transverse plane extending midway between the two pairs of core end portions 32, 33 of the two core sections 31. This assures that the two core sections 31 are held properly assembled in their aligned operative core-loop position shown, without requiring extreme accuracy in the construction of aligning member 50 and its aligning grip ends 52. In addition, each aligning grip end 52 has two projecting aligning fingers 53 engaging opposite side surfaces 32–2 of the respective upwardly extending pole leg 32 where it adjoins the associated aligning shoulder portions 31–1 of each core section 31. Each grip end portion 52 of spring junction member 50 is shaped so that its intermediate grip end edge 52–1 engages the mid region of the outer surface of the core section 31 gripped thereby; and that its two grip fingers 53 engage with their inward edges the side edge surface 32–2 of the gripped core section, and with the finger end edge 53–1 of the upper aligning surface of the aligning shoulder edge portion 31–1 of the respective core sections. The spring junction member 50 is shown in Figs. 2–7 in its elastically deformed condition wherein its two end arms 51 are outwardly deformed or bent against their elastic restoring forces so as to embrace with opposite grip ends 52 the mid-part of the outer sides of the two assembled core sections 31 in the region of their aligning shoulders 31–1 along a mid-plane of the two core sections 31 for holding them in the assembled condition across their facing pole end surfaces, in the manner shown in Figs. 2–7. When released from this deformed condition, the ends of the two end arms 51 of the spring junction member 50 are much closer to each other than in the position in which they are shown in these figures.

The open edge region at the opposite sides of aligning casing 38 has two aligning recesses 38–3 shaped to receive in aligning engagement a set of two opposite aligning portions of the aligning spring member 50 located at the junction edge corner at which the respective wider grip end portions 52 adjoin the narrower end arms 51 of the aligning member 50. This fixes the aligned position of the spring junction and aligning member 50 and the core assembly 30 held thereby relatively to the aligning casing 38.

Any resin material which may be prepared to remain for a period of time or pot like, such as one hour or more, in a liquid state in which it will flow and fill all spaces in the interior of the head, such as in the casing 38, and between its various components including the relatively narrow channel spaces through which the insulated terminal conductors 44 pass to the exterior of the head, and which resin material is readily set or cured thereafter into a hard, strong junction body holding all adjoining head elements affixed to each other, may be used for the resin junction body 39 of a head such as described herein. Among resin materials having such properties and suitable for such resin junction body, are epoxy resins which may be cast in liquid state, and polymerized polyester resins which may be cast in liquid state, and which will become set into a hard, strong junction body joining all parts with which it makes contact, into a strong, relatively rigid integral solid structure.

Before using such resin for the junction body 39 of the head, there is dispersed in the liquefied resin material the proper amount of filler particles, such as small silica particles, for minimizing the wear of the guide surface 40 of the head and for minimizing the differential thermal expansion forces developed between the solidified, hard resin body 39 and the core elements 31 held fixed therein. As stated above, by dispersing in the synthetic resin body, 50% to 65% of filler particles of silica or other hard substances described above, the thermal differential expansion forces exerted on the critical core assembly by the hardened resin body in which it is imbedded, are minimized to a negligible value, and the aligning mounting of the core assembly and its minute transducing gap space 28 is not affected even if the head is subjected to large variations in temperature, between room temperature such as 280° C. and a raised temperature such as 150° C. to 200° C. By embodying in the resin body material such filler particles of a hard substance such as silica or the other substances referred to above, the exposed guide surface 40 of the head, along which the record tape 27 moves in contact engagement with and past the pole faces of the core gap region 28, is given such high abrasion resistance as to assure the smooth guidance of the tape and its perfect contact engagement between the moving tape elements and the pole faces 29 of the core gap region 28 are not disturbed by worn-out surface portions of the tape guide surface 40 during a long useful operating life of the head, such as at least 1000 hours.

Epoxy resins having suitable properties for use as such head junction bodies 39, are described in the September 1956, Encyclopaedia Issue of Modern Plastics, pages 105–109, and in the Plastics Properties Chart of this issue, under the heading "Epoxy Cast Resins"; and also in the September 1955. Encyclopaedia Issue of Modern Plastics, pages 101–109, and the the chart thereof; also in the article by John Charlton, "Alloying With Epoxides," published September 1954 in Modern Plastics, pages 155–161, 240–243; and in the patents listed on pages 242 and 243 of that article; also in the article, "Epoxy Resins from Bis-, Tris-, and Tetrakis-Glycidyl Ethers," by Dearborn et al., published December 1953, in Industrial and Engineering Chemistry, pages 2715–2721, and in Epoxy Resins by Lee and Neville, published 1957 by McGraw-Hill Book Co.

Polyester resins having suitable properties are described in the September 1956 Encyclopaedia Issue of Modern Plastics, pages 138–143, and in the references given therein, and also in the chart forming part thereof; and also in the September 1955 Encyclopaedia Issue of Modern Plastics, pages 176–178, and the chart forming part thereof.

In practice, good results are obtained by using as the resin material for the resin junction body of the head, the epoxy resins which are commercially supplied in the United States by the Shell Chemical Corporation under the trade-name Epon; by Ciba Company Inc. under the trade-name Araldite; and by Minnesota Mining & Mfg. Company, under the trade-name Scotchcast.

As examples, good results are obtained by using for the resin junction body of the magnetic head of the invention, epoxy resins supplied by Shell Chemical Corporation under the trade-name Epon RN–48, which is liquid at 55° C. and is cured into a hard, strong body by the addition of 5% piperidine, within 24 hours at 60° C., or in 2 or 3 hours at 100° C. Good results are also obtained by using for the resin junction body of the head, epoxy resins supplied by Ciba Company Inc. under the trade-name Araldite 6010, when mixed with an addition of a curing agent consisting of polyamide 115, or under the trade-name Araldite 502 when combined with an alkaline hardener HN–951, by procedures described in Technical Data Bulletins No. 8 and No. 4, respectively, published by this company. Good results are also obtained by using for the resin junction body of the head, epoxy resins supplied by Minnesota Mining & Mfg. Co. under the trade-name Scotchcast resin CRP 228, consisting of a two-part mixture and which has a pot life from three to four days at room temperature, and is in a liquid state for pouring at 120° C., and is cured into a hard body in from 1 to 2 hours at 120° C.; or Scotchcast resin CRP 232, consisting of a single plastic mixture containing all its hardening ingredients, which is liquid and has a pot life of 2 to 4 hours at 65° C., and is cured into a hard body within 5 to 8 hours at 150° C.; also Scotchcast resin CRP 236, consisting of a single palstic mixture containing all its hardening ingredients, which is liquid and has a pot life of 60 to 70 hours at 65° C. and is cured within a few minutes at a temperature between 190° C. to 200° C., into a hard, strong body.

There will now be described one practical way suitable for the mass production of high-quality magnetic heads of the type shown in Figs. 1 and 2, out of the head elements described above in connection with Figs. 3–7.

In order to suppress undesired noise signals in magnetic record transducing heads of the type shown, the metallic shield casing 38 is connected to the ground or the grounded side of the amplifier circuit of the associated playback or recording apparatus. Suppression of undesired noise signals also requires a grounding connection between the shield casing 38 and the metallic core leg sections 31 of the magnetic core 30.

In practice, a very effective electric grounding connection between the magnetic core 30 and the grounded shield casing 38 is obtained by applying a metallic conducting paint to the junction regions between the metallic end portions 52 of the aligning spring member 50 which extend between the core legs 32 and the shield casing 38. Suitable conductive paints for this purpose are metallic conductive paints such as silver conductive paint available on the market. The coating of such metallic conducting paint is applied before filling the interior of the shield casing 38 with the resin junction body 39 which upon solidification joins all parts of the head into a rigid integral structure. Suitable conductive silver paints are, for instance, those described in U.S. Patent 2,461,878, but prepared without the addition of the low melting glass powder. In other words, the paint is formed of the metallizing powder, such as silver powder, held dispersed in a liquid paint medium consisting, for instance, of an organic resin held dissolved in a suitable organic solvent which vaporizes readily and leaves along the coated surfaces a layer of silver powder containing about 5% to 15% of the binder resin. Commercially available conductive metallic paints such as sold by Du Pont de Nemours Company, may be used for this purpose.

As shown in Figs. 1 and 5, to provide the electric grounding connection, a layer of conductive paint 37–5 is applied at the junction region between the metallic aligning grip end portions 52 of the aligning spring member 50 and the adjacent surfaces of the core legs 42 engaged thereby. The grounding connection is completed by similar layers of conductive paint 38–5 applied to the junction regions between the metallic aligning grip end portions 52 and the metallic surfaces of the shield casing 38 engaged thereby. After filling the shield casing with the resin junction body 39 and solidifying it therein, the metallic paint junction elements 37–5 and 38–5 are held embedded in the solidified resin junction body, thus assuring a good metallic grounding connection between the core 30 and the metallic shield casing 38.

Similar conductive metallic paint coatings 44–5 may be applied to the stripped inner metallic ends 44–1 of the terminal conductors 44, for affixing thereto the terminal ends of the transducing coil 35, to assure a good metallic connection between them without a soldering operation. This is an advantage, because the soldering operation frequently results in injury to the fine metallic ends of the conducting wire of the coil 35, which are wound around and have to be metallically joined to the metallic ends 44–1 of the terminal conductors 44.

Figs. 1, 3 and 3–A show also another way of providing a metallic grounding connection between the magnetic core 30 of the head and the metallic shield casing 38. It consists of a strip 36–2 of spring metal, such as brass, which has the same width as the inner core width 33, and is held biased in metallic contact engagement therewith in the guide channel of the coil bobbin 36. The grounding strip 36–2 is sufficiently long so that when the core assembly of Fig. 3 is placed within the shield casing 38 (Figs. 1 and 5), the two ends of the grounding strip 36–2 make metallic contact engagement with the side walls of the shield casing 38. The metallic grounding strip 36–2 has two cut-out tongue portions 36–3 bent outwardly therefrom for preventing substantial longitudinal displacement of the grounding strip 36–2 from its position within the core channel of the coil bobbin 36.

When produced, the two alike and interchangeable complementary core sections 31 are each polished along their two core leg end surfaces so that when assembled into a core loop 30 their end surfaces will make perfect surface contact. The two core sections 31 are then assembled with their inner legs inserted through the opposite ends of the hollow core of the coil bobbin 36 and the end faces of their two pairs of core legs come in contact engagement along their outer leg end surfaces at the transducing gap 28 and their inner leg end surfaces 33–1, in the manner shown in Figs. 1–7. A spacing shim of minute thickness may be placed between the end faces of the outer core legs 32 at the tranducing gap 28 so as to fix its predetermined minute dimension. After so assembling the two core sections with the coil 35 seated on the assembled inner core legs 33, the elongated spring junction member 50 is deformed and positioned with its outwardly bent grip ends 52 against the aligning surfaces at the opposite aligning shoulders 31–1 along the mid-part of the two core sections 31 for holding them gripped in their aligned assembled position with the spring junction member 50 in definite alignment relatively to the aligning surfaces of the two core sections 31 and the transducing gap 28 of the core loop 30.

In its original condition, shown in Figs. 3–7, as described above, before shaping its contour the casing 38 of the aligning structure has an edge 38–2 extending beyond the level of the casing edge shown in Fig. 1. As shown in Figs. 3–7, the original casing edge 38–2 of the original open side of the casing is provided with the set of two opposite aligning cut-outs or slots 38–3 in the opposite parallel side walls of the casing 38 which extend parallel to the adjacent side surfaces of the two core sections 31 and their outer pole legs 32. The casing aligning cut-outs 38–3 have the same width as the transverse width of the outer pole legs 32 and as the main length of spring junction aligning member 50 and its two end arms 51, so that these end arms 51 shall fit into the aligning slots 38–3 when the assembly of the two core sections 31 with their aligning spring junction member 50 is placed in the aligning slots 38–3 within the casing 38. In this aligned casing position, the rear edge surface 52–4 of each finger grip portion 52 of spring-junction aligning member 50 has an inclined edge surface 52–4 engaging the inward side of the casing cut-out 38–3 of the open casing edge so that the corner between this inclined edge surface 52–4 and the parallel edge surface of the straight end arm portions 51 of the junction member alignly engages the opposite side edges of the respective aligning casing cut-outs 38–3. This aligning engagement simplifies and assures proper and aligned positioning of the assembled core sections 31 when they are positioned with their spring junction member 50 in the aligning cut-outs 38–3 of the aligning casing 38, thereby fixing the aligned position of the transducing gap 28 of the core assembly 30 relatively to the aligning mounting member 41 of the head.

Before positioning the core loop and coil assembly with its aligning junction member 50, such as shown in Fig. 3, in the aligned position within the casing 38, as shown in Figs. 5–7, there are first inserted into the oversized passages 42–1 of the head aligning shank 42 the outer ends of the two insulated terminal conductors 44 so that their stripped exposed terminal pins 45 project outwardly from the lower end of the mounting shank 42, as seen in Figs. 1 and 5, with their inward offset stripped ends 44–1 projecting upwardly in the casing to about the upper level of the coil bobbin 36, as shown in Figs. 1, 2 and 3–7. Thereupon the core loop and coil assembly with its aligning junction member 50, as seen in Fig. 3, is placed into the interior of the aligning casing 38, as seen in Figs. 5–7, with the two opposite aligning end portions of the junction member 50 seated in their aligning position within the opposite aligning slots 38–3 of the open casing edge so that the core 30 with its transducing gap region 28 are thereby held in the properly aligned position relatively to the aligning casing structure 38 and its aligning shank 42. After so positioning the core-coil assembly with junction member 50 in the casing 38, as seen in Figs. 5–7, the exposed terminal lead ends of the winding coil 35 are metallically joined, as by soldering, to the exposed interior metallic terminal ends 44–1 of the two terminal conductors 44. Thereupon, the interior of the casing 38 is filled with the liquid resin junction body 39 containing the required amount of inorganic filler particles, as described above.

Before filling the casing 38, as seen in Figs. 5–7, with the liquid resin body, the outer open ends of the channels 42–1 of the aligning shank 42 are sealed, as by applying a readily removable cementitious material, such as pitch, to the exposed end surface of the shank 42 at the region where the exposed terminal pins 45 project therefrom. The aligning slot portions 38–3 along the edge of casing 38 are likewise blocked, as by placing therein gate portions of any suitable sheet material such as impregnated cardboard, metal, or the like, to prevent escape of liquid resin therethrough. After filling the interior of the casing with the resin containing the dispersed filler particles, the resin-filled casing and head assembly is subjected to vacuum, as in an evacuated space, to cause gases entrapped by the liquid resin within the casing 38 to escape therefrom so that all spaces within the casing and its terminal conductor channels 42–1 and all the crevices between the different portions of the core and coil assmbly, are filled with the resin body up to the top of the open casing. Thereupon the resin-filled casing and aligning structure 38 with the head assembly 30, 36 held in aligned position therein by the aligning spring junction member 50, are subjected to curing for the required length of time until the cast resin is fully hardened. This curing treatment is carried on in accordance with the processing instructions provided by the suppliers of the respective epoxy resin compositions, as explained above.

The fully hardened resin junction body joins the core and coil and other elements of the head assembly in their properly aligned position relatively to the aligning casing 38 and its aligning mounting member 41, 42, in which they are shown in Figs. 5–7. Thereupon the upper part of the assembly, as seen in Figs. 5–7, is ground away along the curved guide surface contour 40 indicated in Fig. 5 by dash-double-dot line 27, representing the path of the tape along the guide surface 40 of the transducer head 25. This grinding operation removes the outwardly projecting part of the spring junction member 50 and the part of the casing and upper region of the solidified resin filling extending above the level of the guide surface contour indicated in Fig. 5 by dash-double-dot tape path 27, and representing the guide surface 40 along which the tape moves past the transducing gap region 28 along the adjoining core pole faces 29 exposed along the guide surface 40 of the head, as seen in Figs. 1, 2.

The grinding operation also removes a certain amount of the thickness of the outer pole arms 32 along the end portions thereof adjoining the transducing gap 28 at a level required for optimum high-quality output of the desired wide frequency range, and providing the exposed core pole faces 29 along which the moving elements of the tape make contact with the core loop 30 as they move past the transducing gap 28. The grinding operation is followed by a polishing operation in which the continuous guide surface 40 of the head is given utmost smoothness for guiding the magnetic tape 27 with utmost smoothness towards, into and from intimate and uniform contact engagement with the pole faces 29 of the head as it moves past the transducing gap 28. The grinding and polishing operation may be preceded by or followed by the step of removing the sealing cement or pitch from the end face of the aligning shank 42, as by dissolving it with a suitable solvent.

In the head of the invention described above in connection with Figs. 1–7, the stiff aligning junction member 40 fixes the aligned position of the magnetic core loop 30 with its critical non-magnetic transducing gap 28 relatively to the head aligning mounting structure 41 and therethrough relatively to the moving magnetic record tape 27. The aligning junction member 50 has a set of two opposite aligning finger elements 52 which are arranged to establish aligning engagement with the core and coil assembly along the two aligning shoulders 31–1 of the core loop assembly 30. The aligning junction member 50 has also a set of two opposite aligning elements formed by outwardly tapering rear edges 52–4 of its aligning finger elements, which enter into aligning engagement with the side edges 38–3 and the bottom edges 38–4 of the aligning slots 38–1 of the aligning casing 38, thereby fixing the lateral aligned position of the transducing gap 28 of the core loop relatively to the mounting and aligning member 41, 42 of the head, as well as the aligning level of the pole faces 29 of the core loop relatively to the aligning member 41, 42, and therethrough to the record tape 27. A simple aligning structure thus makes it possible to retain the core and coil assembly with the critical transducing gap 28 in properly aligned position relatively to the mounting and aligning member 41, 42 and its aligning casing when they are assembled in the manner shown, while the aligning casing is filled with the resin junction body and the latter solidifies to provide the fixed aligning junction between the critical elements of the head assembly and the aligning structure 41, 42 which in turn fixes the aligned position of the transducing gap 28 relatively to the path of the magnetic record tape 27 while either playing back or making magnetic records thereon.

Without thereby limiting the scope of the invention and only in order to enable ready practice thereof, there are given below specific data of a practical magnetic recording and playback head of the invention of the type described above in connection with Figs. 1–7, and designed for recording on or playing back magnetic records from two magnetic record tracks extending side by side on a conventional magnetic tape ¼″ wide, first while one track along one half of the tape moves along a tape path 27 past the pole faces 29 and the transducing gap 28 of the core loop along the guide surface 40 of the head, and also while the other track on the other half of the tape width similarly moves in the same direction over the pole faces 29 and the transducing gap 28 of the core loop 30.

The transverse over-all dimension of the head in the direction of the tape path 27, is .389″, and it is .488″ in the direction transverse thereto. The total height of the head in its axial direction including its mounting shank, is .725″, and the external terminal pins extending from the shank are .200″ long. The total height of the elongated mounting member 43 with its shank 42 is $^{11}\!/_{32}$″. The magnetic core loop 30 is formed of rolled magnetic sheet material of high permeability and low retentivity, and consisting of "479 Permalloy," containing as principal ingredients about 4% molybdenum, about 79% nickel, the balance iron, and minute other additions. The rolled stock out of which the core loop 30 is made, is about .118″ thick. The transverse width of the wider inner core legs 33 is .120″, and the transverse width of the outer core legs 33 is .090″. The length of the inner core leg which defines the distance between the plane of the pole end surfaces of the core legs from the outer side of each core section is .142". The metallic conductor of the terminal pins 45 and of the insulated terminal conductors 44, is of beryllium copper, and has a circular cross-section about .020" in diameter. The insulating coating consists of a coating layer of nylon extruded thereover, and the thickness of the coated insulated conductors 44 is about .040". The channel spaces 42–1 of the mounting shank through which the insulated terminal conductor 44 passes, are of circular cross-section, and about .080" in diameter. The aligning junction spring 50 is formed of beryllium copper sheet stock .018" thick, and its width in a direction transverse to its length is .090", being equal to the similar transverse width of core pole faces 29. The aligning and gripping fingers 53 at each end of the aligning and junction spring 50 have a sliding fit over the upper core legs 32 engaged thereby at the region of their aligning shoulders 31–1 when the two core sections 31 are held in clamped and assembled alignment by the aligning junction spring 50.

An important feature of the simple aligning member which aligns the magnetic core loop and its critical transducing gap both in the laterally aligned and also in the vertically aligned position relatively to its aligning member 41, 42, is the fact that it also centers the critical transducing gap of the core loop relatively to the aligning member and thereby simplifies grinding of the head to the desired contour and the optimum height of the pole end faces along the non-magnetic gap 28 in a direction perpendicular to the path of the tape.

A simple aligning member of the type described above in connection with the two core sections of a core loop of a record transducing head for transducing records of a single magnetic record track, may be modified in accordance with the invention so that each of its gripping fingers 52 has a grip edge 52–1 wide enough to grip two nearby core sections 31 of two independent core loops, of two adjacent transducing core units, each interlinked with its own windings for recording two complementary stereophonic magnetic signal records on two adjacent stereophonic record tracks, and/or for playing back two stereophonic signal programs from such two stereophonic record tracks.

It will be apparent to those skilled in the art that the novel principles of the invention disclosed herein in connection with specific exemplifications thereof, will suggest various other modifications and applications of the same. It is accordingly desired that in construing the breadth of the appended claims they shall not be limited to the specific exemplifications of the invention described above.

I claim:

1. In a magnetic transducing head for transducing magnetic records with a relatively moving magnetic record track of predetermined width, a substantially closed magnetic core loop having two confronting core sections with two sets of confronting pole ends, one set of pole ends having confronting pole faces separated by a non-magnetic transducing gap extending transversely to said track along one side thereof, transducing windings interlinked with said core, and therethrough with elements of said track bridging said transducing gap, a relatively rigid aligning structure having a casing enclosing at least in part and holding said core loop and windings predeterminedly aligned relatively to said track, said casing having a casing opening bordered by two opposite casing edges between which the transducing-gap region of said core loop is exposed to bridging by said track, a solidified resin body fixed within the interior of said casing and holding affixed and embedded therein said core loop and said windings, core areas of the core pole ends of the transducing gap region of said core loop being exposed along an outer surface of said resin body extending between said casing edges, the outer surface of said resin body and of the core pole ends exposed along said outer surface having the shape of a continuous, smooth, convex guide surface extending in a direction generally transverse to said pole faces for smoothly guiding a flexible magnetic track in continuous substantially uniform contact engagement with said core areas towards, past and away from the transducing gap separating the last-named pole ends, said resin body containing dispersed therein 50% to 65% by weight of inorganic filler particles having a hardness of the order of the hardness of the ferrous oxide particles of a magnetic record track and materially greater than the hardness of said resin body, and also having a materially lower temperature expansion coefficient, for suppressing abrading action by hard ferrous particles of a record track while moving in contact engagement with said guide surface past the transducing-gap region of said loop, and for also minimizing the strains to which said core sections are exposed by differences in relative expansion of said core sections and said resin body under variations of temperature.

2. In a magnetic transducing head for transducing magnetic records with a relatively moving magnetic record track of predetermined width, a substantially closed magnetic core loop having two confronting core sections with two sets of confronting pole ends, one set of pole ends having confronting pole faces separated by a non-magnetic transducing gap extending transversely to said track along one side thereof, transducing windings interlinked with said core, and therethrough with elements of said track bridging said transducing gap, a relatively rigid aligning structure having a casing enclosing at least in part and holding said core loop and windings predeterminedly aligned relatively to said track, said casing having a casing opening bordered by two opposite casing edges between which the transducing-gap region of said core loop is exposed to bridging by said track, a solidified resin body fixed within the interior of said casing and holding affixed and embedded therein said core loop and said windings, the core pole ends of the transducing gap region of said core loop being exposed along an outer surface of said resin body extending between said casing edges, the outer surface of said resin body and of the core pole ends exposed along said outer surface having the shape of a continuous, smooth guide surface extending in a direction generally transverse to said pole faces for smoothly guiding a flexible magnetic track in continuous substantially uniform contact engagement with said core areas towards, past and away from the transducing gap separating the last-named pole ends, said resin body containing dispersed therein 50% to 65% by weight of inorganic filler particles having a hardness of the order of the hardness of the ferrous oxide particles of a magnetic record track and materially greater than the hardness of said resin body, for suppressing abrading action by hard, ferrous particles of a record track while moving in contact engagement with said guide surface past the transducing gap region of said loop.

3. In a magnetic transducing head for transducing magnetic records with a relatively moving magnetic record track of predetermined width, a substantially closed magnetic core loop having two confronting core sections with two sets of confronting pole ends, one set of pole ends having confronting pole faces separated by a non-magnetic transducing gap extending transversely to said track along one side thereof, transducing windings interlinked with said core, and therethrough with elements of said track bridging said transducing gap, a relatively rigid aligning structure having a casing enclosing at least in part and holding said core loop and windings predeterminedly aligned relatively to said track, said casing having a casing opening bordered by two opposite casing edges between which the transducing-gap region of said core loop is exposed to bridging by said track, a solidified resin body fixed within the interior of said casing and holding affixed and embedded therein said core loop and said windings, the core pole ends of the transducing gap region of said core loop being exposed along an outer surface of said resin body extending between said casing edges, the outer surface of said resin body and of the core pole ends exposed along said outer surface having the shape of a continuous, smooth, convex guide surface extending in a direction generally transverse to said pole faces for smoothly guiding a flexible magnetic track in continuous substantially uniform contact with said core areas towards, past and away from the transducing gap separating the last-named pole ends, the resin of said resin body having a materially greater coefficient of thermal expansion than said core sections, said resin body having dispersed therein 50% to 65% by weight of inorganic filler particles having materially lower temperature-expansion coefficient than the resin of said resin body for minimizing the strains to which said core sections are exposed by differences in relative expansion of said core sections and said resin body under variations of temperature.

No references cited.